March 10, 1931.  J. KESTEL  1,796,032
PHOSPHATE SPREADER
Filed April 28, 1928
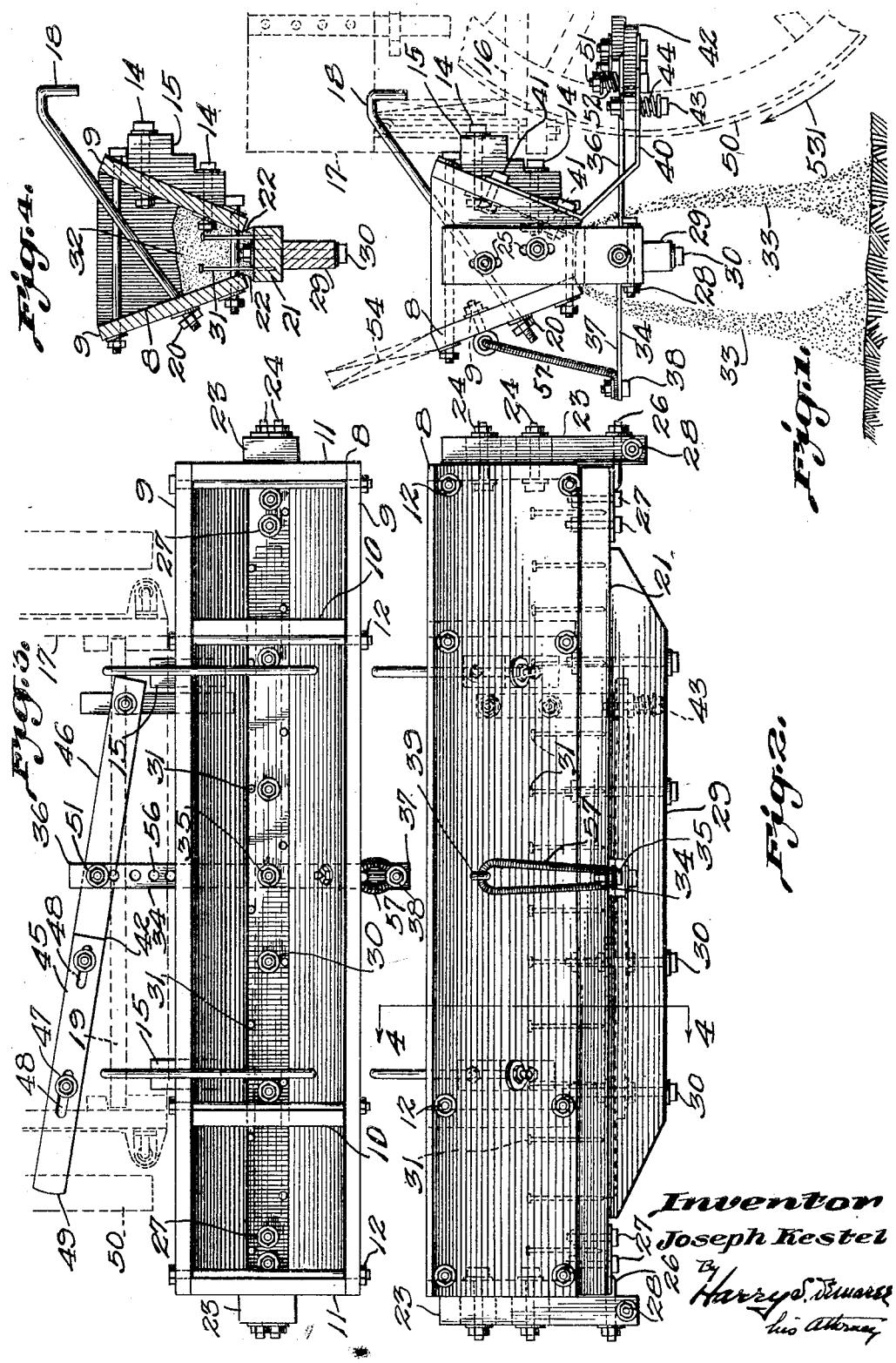

Patented Mar. 10, 1931

1,796,032

UNITED STATES PATENT OFFICE

JOSEPH KESTEL, OF MANHATTAN, ILLINOIS, ASSIGNOR TO RUHM PHOSPHATE & CHEMICAL COMPANY, A CORPORATION OF TENNESSEE

PHOSPHATE SPREADER

Application filed April 28, 1928. Serial No. 273,443.

This invention relates to a device for spreading phosphate.

The object of this invention is to provide a phosphate spreader of a type which may readily be built by the farmer, and from such materials and parts which are readily obtainable from his local merchant.

A further object is to provide an arrangement whereby the spreader device may be coupled to the rear end of an ordinary wagon, and whereby no special alteration or provisions need be made to the wagon to accommodate such coupling means.

A further object is to provide a simple and practical means in the form of an agitating device which cooperates with the revolving rear wheel of the wagon, such means serving to effect a constant and uniform flow of the phosphate from the spreader device to the soil, but only while the wagon moves in the forward direction; if the wagon is at rest or is moved backward then the object is to retain the phosphate in the spreader device.

Other objects will be apparent from the following description, when considered in connection with the accompanying drawing, in which similar numerals refer to similar parts throughout the several views.

Fig. 1, is an end view of the spreader device, and is shown in connection with the rear end of a wagon, the wagon is shown in light broken lines.

Fig. 2, is a side elevation of Fig. 1.

Fig. 3, is a plan view of Fig. 2.

Fig. 4, is a sectional view of Fig. 2 taken on line 4—4.

With reference to the drawing, 8 is a trough comprising two side boards 9, cross braces 10 and end pieces 11. This trough is held together by bolts 12. Fixed to the trough 8, through bolts 14, are two brackets 15 which are adapted to rest on the floor 16 of the wagon 17. Hook bolts 18 are provided to serve as hangers for the trough 8, they extend through one of the side boards 9 of the trough and are arranged to hook over the end gate 19 of the wagon as shown. These hook bolts 18 are provided with a threaded end, and a nut 20, and thereby, their extended length may be increased or decreased to accommodate the end gates of various wagons. Through this coupling arrangement the trough 8, including all its connected elements, may readily be lifted from the wagon box and transferred to another wagon, and in the event that the end gate of the other wagon is higher or lower, the extended length of the hook bolts 18 may be readily adjusted by turning the nuts 20 and thereby level the trough.

The bottom of the trough 8 is formed by the agitator beam 21 positioned to provide narrow open spaces as shown at 22 throughout the entire length of the trough. The agitator beam 21 is carried by the agitator hangers 23 which are adjustably connected to the trough through bolts 24. These bolts extend through slots 25 as formed in the hangers 23 and therefore the hangers may be raised or lowered and locked in various positions, and accordingly the extent of the open spaces 22 may be varied.

The connection between the agitator beam 21 and agitator hangers 23 is formed by the studs 26 of a type commonly known as wagon box bolts which are readily obtainable in rural districts and which are fixed to the agitator beam through bolts 27 and extend through the hangers 23. By this arrangement the agitator is pivotally mounted with respect to the trough, the pivot bearings being formed in the hangers 23 and these bearings are reinforced by the bolts 28. The agitator beam 21 is reinforced for stiffness by the brace beam 29 which is fixed thereto through bolts 30. Ordinary nails 31 are shown driven partially into the upper side of the agitator beam which serve as agitator elements for stirring the phosphate when, during operation, the agitator beam is caused to rock rapidly to and fro on the studs 26, as will hereinafter appear, while the phosphate, indicated at 32, is virtually carried thereby. The nails 31 protrude into the bed of phosphate as shown in Fig. 4 and are vibrated by the rocking action of the agitator beam serving to agitate the phosphate so that it will settle to the bottom of the trough to lay upon the beam, and the rocking action thereof will cause the phosphate to sift out through the openings 22 to fall upon the soil. The phosphate falling upon the soil is represented as at 33, Fig. 1.

As a means for rocking or agitating the agitator beam 21, there is provided a lever 34 secured thereto through the bolt 35, and arranged to extend forward as at 36 and rearward as at 37. To the rear end thereof is secured a spring 57, through the bolt 38, and arranged to loop through the eye bolt 39 carried by the side board 9 of the trough. This spring normally pulls upward on the rear end of the lever 34 and naturally tends to tilt the agitator beam 21 in this particular direction.

A bracket 40 is fixed to the side board 9 of the trough, through bolts 41 and arranged to extend horizontally forward to carry the one end of the tipping lever 42. A connection between the lever 42 and bracket 40, is formed of a bolt 43, which is arranged with a spring 44 between the head thereof and the under side of said bracket. This form of connection provides a flexible joint which serves as a fulcrum for the lever 42.

The lever 42 extends laterally with respect to the direction of movement of the wagon, and is made of two pieces 45 and 46 which are adjustably connected through bolts 47 and slots 48; the length of this lever should be adjusted so that the end 49 thereof just engages the spokes of the rear wagon wheel 50, but should be sufficiently short so that said lever end 49 will skip over the spokes when the wheel revolves. By this arrangement the revolving wheel will impart an oscillating movement to the lever 42, substantially in a vertical direction, and moving around the pivot point formed by the bolt 43.

The lever 34 and tipping lever 42 are connected through the bolt 51 and here again a spring indicated by the reference character 52, is arranged between the nut of said bolt and the upper side of the lever 34, and accordingly form a flexible connection.

The lever 42 should be mounted to lay on top of the bracket 40 and hang beneath the lever 34; then as the wagon wheel 50 revolves in the direction indicated by the arrow 53, as when carrying the wagon forward, the spokes thereof raise and release the lever end 49, and a positive movement of the lever 34 with a corresponding tipping action to the agitator beam 21 is assured; but should the wagon be moved backward, then the wheel 50 revolves in the opposite direction, the spokes thereof tip the lever end 49 downwardly and no corresponding tipping action of the lever 34 and agitator beam 21 is desired or effected, for then both springs 44 and 52 yield to the movement of the tipping lever 42. The nature of phosphate is such that it will not naturally drain from the trough 8, that is, not through the openings 22, unless the agitator beam 26 is vigorously vibrated or rocked to and fro, particularly since the openings 22 are narrow, therefore there will be no spreading of phosphate while the wagon is at rest.

The lever 34 is provided with a series of holes 56 so that the lever 42 may be connected thereto at various points more or less forward with respect to the trough 8, consequently the end 49 of the lever 42 will accordingly be positioned at various points more or less forward; the bolt 51 of course being adapted to engage any of the holes 56. This arrangement is provided so that the end 49 of lever 42 may be suitably positioned to properly engage the spokes of the wagon wheel and accommodate variations which may exist between different wagons.

It is now obvious that as the wagon moves over the land the revolving rear wheel imparts a vertically oscillating movement to the tipping lever 42 which in turn transmits a similar action to lever 34, and consequently the agitator beam 21 is rapidly rocked to and fro on its studs 26, and the spreading of any phosphate which may be in the trough 8 is effected.

To increase or decrease the spread of phosphate per acre it is merely necessary to raise or lower the agitator hangers 23, thereby increasing or decreasing the space 22 between the agitator beam and the lower edges of the side boards 9 of the trough, and accordingly increasing or decreasing the quantity of phosphate deposited by the spreading device with respect to the land surface covered by the wagon.

The practice in operating this device is to provide a man to shovel the phosphate from the wagon to the trough 8 while the wagon is drawn over the land; then to avoid an over splash of the phosphate, a back board may be fixed to the trough as shown at 54, in light broken lines.

To protect the flowing phosphate from the action of the wind, a canvas may be fixed to the trough 8, and arranged to hang down around the stream of flowing phosphate to a point close to the ground.

Having thus described my invention, I claim:—

1. In a phosphate spreader, a trough having an open bottom, means for mounting the trough to the rear end of a wagon, an agitator beam relatively spaced with respect to said trough but substantially closing the bottom thereof, pivotal mountings for said agitator beam, and mechanism arranged to directly cooperate with the spokes of the wagon wheel and rock said agitator beam in response to movement of said wagon.

2. In a phosphate spreader, a trough, means for mounting the trough to the rear end of a wagon, means for sifting the phosphate from said trough, a lever carried by said trough and arranged to directly engage the spokes of the wagon wheel to be oscillated vertically thereby, and means connecting said lever with said sifting means to effect operation thereof through the action of said lever.

3. In a phosphate spreader, a trough having an open bottom, means for mounting the trough to the rear end of a wagon, a beam relatively spaced with respect to said trough but substantially closing the bottom thereof, pivotal mountings for each end of said beam, means for raising and lowering said beam with respect to said trough through adjustment of said mountings to vary the space therebetween, and means operable in connection with the revolving wagon wheel for rocking said beam on said pivotal mountings.

4. In a phosphate spreader, a trough having an open bottom, means for mounting the trough to the rear end of a wagon, a beam relatively spaced with respect to said trough but substantially closing the bottom thereof, pivotal mountings at each end of said beam, a lever fixed to said beam and extending forwardly and rearwardly thereof, a contractile spring connecting the rearwardly extending end of said lever to said trough, and means operable in connection with the spokes of the wagon wheel, while revolving, to intermittently raise and release the forwardly extending end of said lever and accordingly permit said spring to intermittently raise the rearwardly extending end of said lever.

5. In a phosphate spreader, a trough having an open bottom, means for mounting the trough to the rear end of a wagon, a beam relatively spaced with respect to said trough but substantially closing the bottom thereof, pivotal mountings at each end of said beam, a lever fixed to said beam and extending forwardly thereof, a second lever mounted laterally with respect to said forwardly extending lever and connected thereto and operably arranged to engage the spokes of the wagon wheel and oscillate in a direction substantially vertical and thereby oscillate the first said lever for rocking said beam.

6. In a phosphate spreader, a trough, means for mounting the trough to the rear end of a wagon, means for sifting the phosphate from said trough, an operating lever for said sifting means arranged to extend forward relative to said trough, a second lever mounted laterally with respect to said forwardly extending operating lever, and arranged for the free end thereof to engage the spokes of the wagon wheel when revolving, a bracket arranged to form a fulcrum for said second lever, means connecting said second lever to said bracket and arranged to yield to permit a limited upward movement of the lever with respect to the bracket, and means connecting the extended end of the first said lever to said second lever at an appreciable distance from the fulcrum point thereof and arranged to yield to permit a limited downward movement of said second lever with respect to the first said lever.

7. In a phosphate spreader, a trough, means for mounting the trough to the rear end of a wagon, means for sifting the phosphate from said trough, an operating lever for said sifting means arranged to extend forwardly relative to said trough, a bracket fixed to said trough, a second lever fulcrumed to said bracket and extending therefrom laterally with respect to said forwardly extending operating lever and arranged for the free end thereof to engage the spokes of the wagon wheel when revolving, means for connecting the extended end of the first said lever to said second lever at an appreciable distance from the fulcrum point thereof, and means for adjusting the free end of said second lever to positions more or less forward with respect to said trough.

8. In a phosphate spreader, a V shaped trough having an open bottom, an agitator beam relatively spaced with respect to said trough but substantially closing the bottom thereof, pivotal mounting means for each end of said beam, agitator elements carried by said agitator beam and arranged to extend upwardly into said V shaped trough, and means for rocking said agitator beam to and fro on said pivotal mountings comprising pivoted levers coacting with said agitator beam and with the spokes of a wagon wheel.

Signed at Manhattan, in the county of Will, and State of Illinois, this 13 day of April, A. D. 1928.

JOSEPH KESTEL.